Patented Apr. 1, 1930

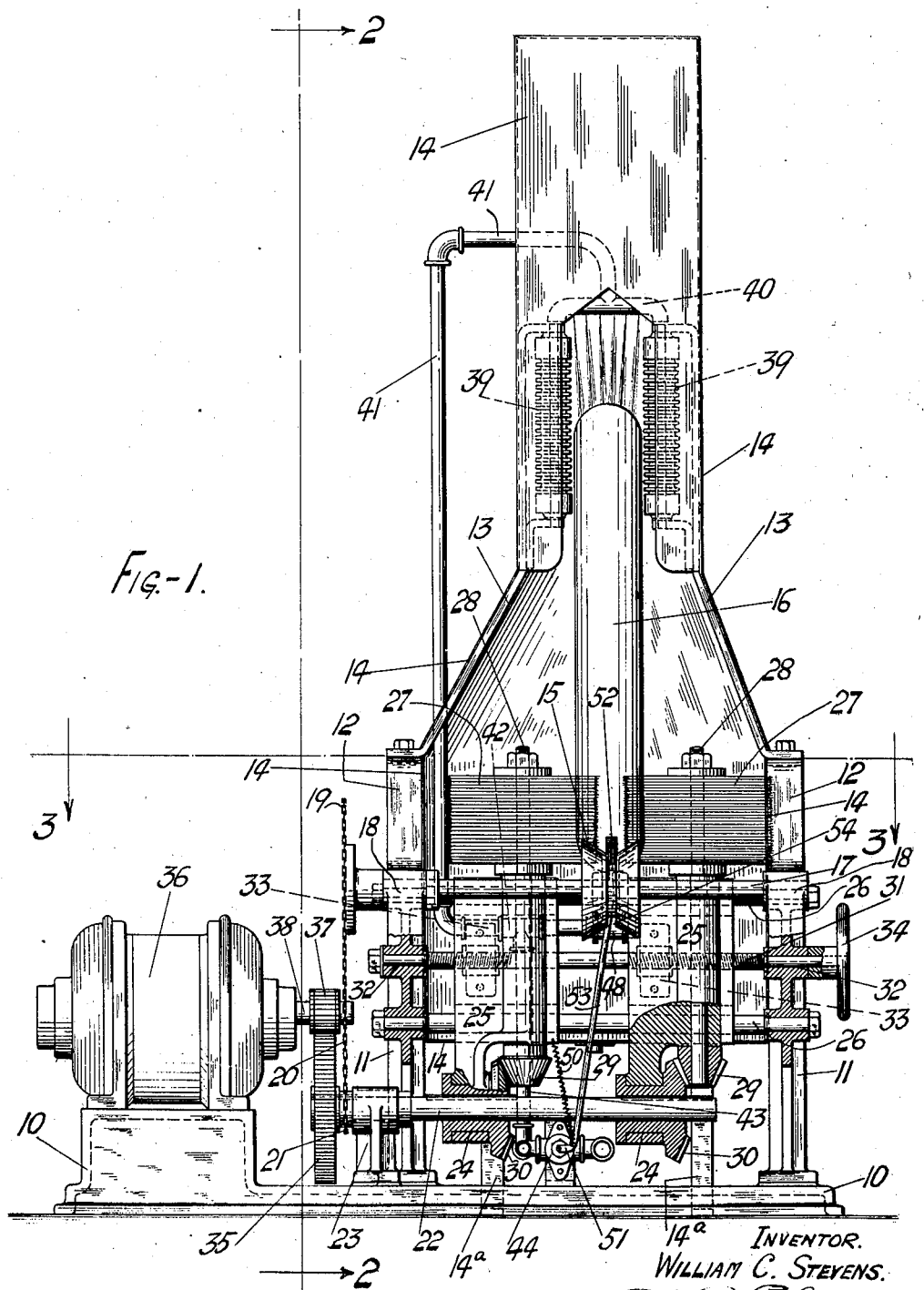

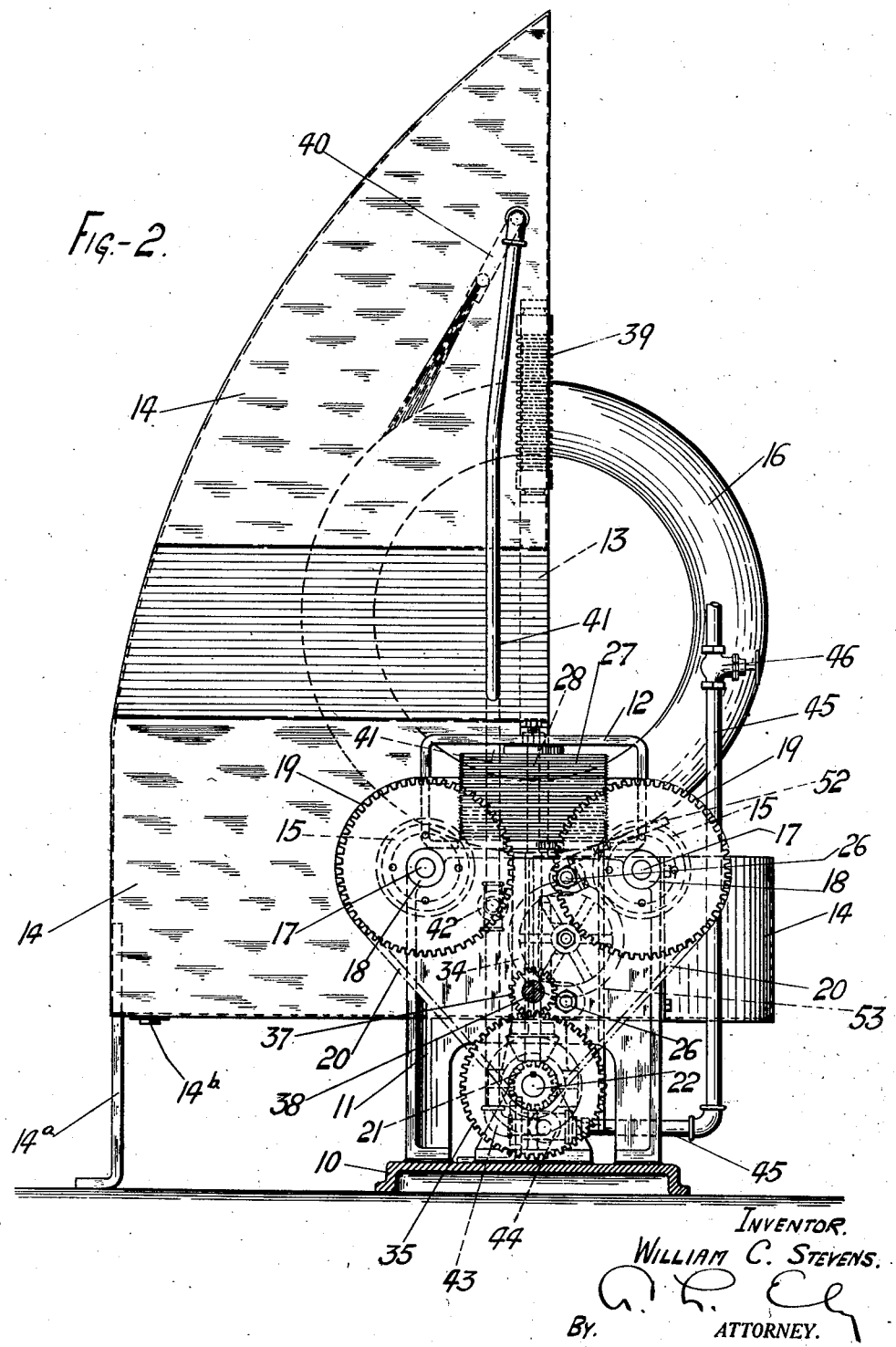

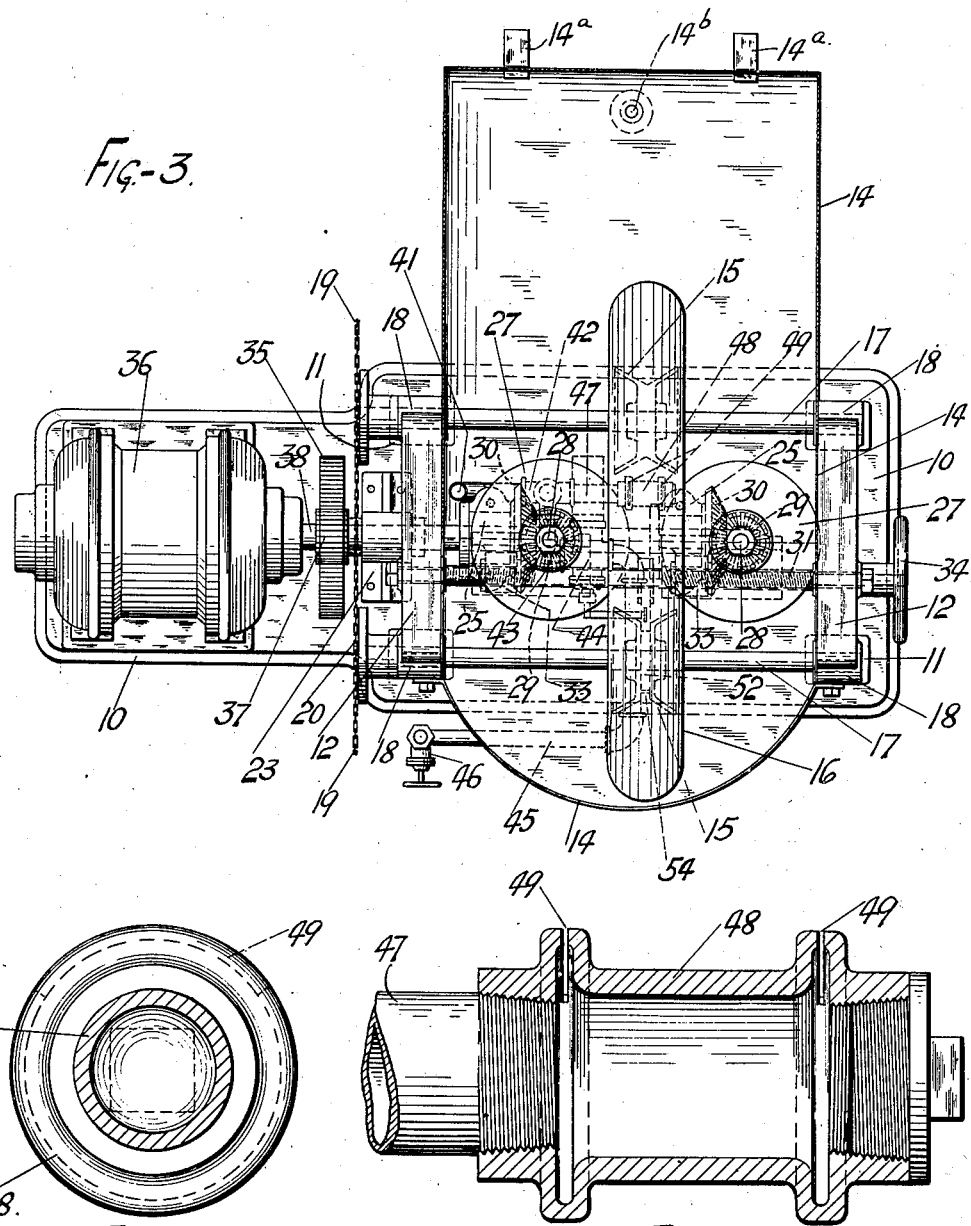

1,753,176

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

METHOD AND APPARATUS FOR DRYING ARTICLES

Application filed December 4, 1924. Serial No. 753,853.

This invention relates to methods and apparatus for cleaning annular articles, such as tires and particularly to methods and apparatus for drying such articles after they have been washed as, for example, in a washing machine and still are wet and more or less covered with suds from the mixture of gasoline and soapy water employed in the washers.

The purposes of the invention, in general, are to provide a method for effectively and rapidly drying annular articles, such as tires, and to provide a machine adapted to automatically carry out the method, the machine being constructed to receive and rotate the tire, and being arranged quickly to accommodate tires of various sizes to permit the action of a number of drying instrumentalities thereon.

The process, in general, consists in rotating the tires while subjecting them to a blast or blasts of air playing over their side walls and treads and in addition while subjecting them to the action of rapidly rotating brushes for removing suds and water therefrom including that which is lodged, for example, between the non-skid projections on the tread.

A particular object of the invention is to provide means operable by the placing of a tire in the machine for opening the valve supplying air to the air blast nozzles, the valve being normally closed to prevent blowing of the air while no tire is in the machine, thus to economize on the power, pumping machinery, etc., which furnishes the blast.

Another object is to provide a drying machine adapted to receive and rotate therein a tire or other annular articles and to be capable of rapid manual adjustment to receive tires of various sizes, whereby the machines are adapted to quickly and inexpensively dry tires of different sizes in succession as they pass to the drier from preceding plant operations.

The foregoing and other objects are obtained by the drier construction disclosed in the accompanying drawings, which drier is adapted to carry out the method of the invention, it being understood that neither the method nor the apparatus are limited to the specific forms illustrated in the drawings and described in the following detailed description.

Of the accompanying drawings:

Figure 1 is a front elevation, partly in section of a machine constructed according to and adapted to carry out the invention;

Figure 2 is a side elevation thereof, partly in section on line 2—2 of Figure 1;

Figure 3 is a plan, partly in section on line 3—3 of Figure 1;

Figure 4 is a transverse section of an air blast nozzle for directing air against a tire in the machine; and Figure 5 is an end elevation thereof.

Referring to the drawings, 10 is a suitable base or support on which are mounted spaced, parallel brackets 11, 11 having mounted on their tops additional brackets 12, 12 on which latter are mounted brackets 13, 13 formed with lower portions diverging outwardly at their lower ends from each other and secured onto the brackets 12. Mounted on brackets 11, 12 and 13 is a hood 14 for substantially enclosing the various instrumentalities for drying the tire, the front of the hood 14 being open as shown in Figure 1 to permit placing of tires in the machine. Hood 14 is supported at the rear of the machine by a bracket 14ª and is provided with a drain outlet closed by a plug 14ᵇ.

For supporting and rotating tires in the machine, spaced supporting rollers 15, 15 are employed, the rollers being formed with peripheral V-grooves in which the tire, indicated at 16, is adapted to seat. Rollers 15 are secured on spaced shafts 17, 17 journaled in bearings 18, 18 formed in the tops of brackets 11. On shafts 17 are secured sprockets 19, 19 having trained thereover a chain 20 which is also trained over a sprocket 21 on a drive shaft 22. Drive shaft 22 is journaled in a bearing bracket 23 mounted on base 10 and in bearings 24, 24 formed in the lower ends of adjustable brackets 25, 25. Brackets 25 are adjustable toward and from each other for a purpose later to be described.

Brackets 25 are slidably mounted on vertically spaced rods 26, 26, spanning brackets 11 and bolted thereto, and carry rotatable brushes 27, 27, the brushes being secured on vertical shafts 28, 28 which are journaled in brackets 25 and have secured on their lower ends bevel gears 29, 29 which mesh with bevel gears 30, 30, journaled in bearings 24 with shaft 22 and keyed or splined thereon so as to be slidable with brackets 25 on shaft 22. For adjusting brackets 25 toward and from each other, thus to adjust brushes 27 toward and from each other, a right and left hand screw shaft 31 is journaled at 32, 32 in brackets 11, the right and left hand threaded portions of shaft 31, respectively extending through correspondingly threaded apertures in brackets 33, 33 secured on brackets 25. A hand wheel 34 is secured on one end of shaft 31 to permit manual adjustment of the brushes.

Power may be supplied to the machine for rotating tires and driving the brushes by gearing shaft 22 by a gear 35 to a motor 36 having a gear 37 on its rotor shaft 38.

For holding the tire 16 in vertical plane while it is rotating, spaced grooved rollers 39, 39 are provided, the rollers 39 being journaled on brackets 13 so that their axes extend vertically, the grooved surfaces of the rollers tending to eliminate considerable friction of the rollers on the sides of the tire.

For directing blasts of air against the tire while it is rotated, a nozzle 40 is arranged above rollers 39 so as to direct an air blast substantially tangentially of the upper surface of the tire 16 and in the direction in which the tire is rotated. Air may be supplied to nozzle 40 by piping 41 connected, for example, to one branch of a T-connection 42, another branch thereof being connected to piping 43, introduction of air into which is controlled by a valve 44 which latter is connected onto a supply line 45 which may be manually controlled by a valve 46. Another branch of T-connection 42 is connected by piping 47 to a second nozzle 48 provided with arcuate slots 49, 49 for directing blasts of air substantially tangentially over the side walls of the tire.

In order that the air will not be blowing during the time one tire is removed and another is placed into the machine, valve 44, which is normally closed by a spring or the like 50 engaged with valve operating lever 51, is arranged to be automatically opened by the tire when it is supported in the machine. To this end a trip lever 52 is pivoted on upper rod 26, or in any other suitable manner, so as to overlie one supporting roller 15 and to extend into the space defined by the grooved periphery thereof. Lever 52 is connected by rod 53 to lever 51 and due to the action of spring 50, lever 52 is normally held out of engagement with the roller 15 but is adapted to be urged toward the roller 15 by the weight of the tire, the roller 15 being grooved as indicated at 54 to receive lever 52 and permit the tire to rest on the roller 15 so that it will be driven.

In the use of the apparatus, motor 36 is continuously driven, thus continuously driving rollers 15 and brushes 27. A tire from the washer is placed on rollers 15 and between rollers 39, the weight of the tire on the tripping lever 52 opening valve 44 and causing blasts of air to be directed from nozzles 40 and 48 entirely across the tire from bead to bead as it rotates, the air from nozzle 40 being directed tangentially of the tread and that from nozzle 48 tangentially of the side walls.

Tire 16 is rotated comparatively slowly by rollers 15 while the air blasts are playing on the tire. At the same time brushes 27 are rotating very rapidly, as will be apparent from the gearing arrangement so that they not only brush or wipe water and suds, etc., from the tire but also remain practically dry by continually throwing off moisture by centrifugal action and by evaporation due to the rapid movement of the brushes in the air, which evaporating action is augmented by the action of the air currents due to the blasts. The blasts tend to mechanically force the water off the tire as well as to rapidly evaporate the same. The moisture is prevented from being sprayed into the room about the machine by hood 14 in which moisture collects and may be withdrawn through the outlet in the bottom thereof.

The tires are thus subjected to the evaporating and mechanical action of the air blasts and to the mechanical action of permanently dry brushes and after one or two revolutions in the machine are thoroughly dried and ready for wrapping for shipment. Tires of various sizes are quickly handled due to the fact that brushes 27 may be rapidly adjusted toward or from each other, while rotating, by the operation of hand wheel 34.

The placing of each tire in the machine automatically opens valve 44, and as each tire is removed valve 44 is closed by spring 50. Thus the air blasts are only operating when required, the cutting off of the air contributing to the economical operation of the process and machine.

Modifications of the invention may be resorted to without departing from the spirit thereof or the scope of the appended claims.

What is claimed is:

1. That method of drying articles of torus shape which comprises rotating the articles while directing one blast of air against their outer peripheries and other blasts of air over their sides.

2. That method of drying articles of torus shape which comprises rotating the article while directing one blast of air substantially tangentially over its outer periphery and other blasts of air substantially tangentially over their sides.

3. That method of drying annular articles which consists in rotating the articles, directing a blast of air against the articles, and rapidly brushing the articles.

4. A machine for drying articles of torus shape comprising means for supporting and rotating the article, means for directing an air blast over the outer periphery of the article, and means for directing an air blast over the sides of the article.

5. A machine for drying articles comprising means for supporting the article therein, means for directing a blast of air onto the article, and means, operable by the placing of the article into the machine, for operating the second means.

6. Apparatus for drying annular articles comprising means for supporting and rotating the article, means for directing an air blast onto the article, and means, operable by mounting the article on the supporting means, for operating the second means.

7. Apparatus for drying annular articles comprising a roller for supporting the article while the latter is revolved, said roller having a peripheral groove, means for directing a blast of air onto the article, said means including a valve, and a trip lever normally overlying the groove in said roller and adapted to be forced therein by the weight of said article, when the latter is mounted on the roller to open the valve.

8. Apparatus for drying annular articles comprising a roller for supporting the article while the latter is revolved, said roller having a peripheral groove, means for directing a blast of air onto the article, said means including a valve, yielding means for normally keeping the valve closed, and a trip lever normally overlying the groove in said roller and adapted to be forced therein by the weight of said article against the action of said yielding means when the latter is mounted on the roller to open the valve.

WILLIAM C. STEVENS.